Aug. 14, 1923.
J. TURNER
1,464,836
FRUIT CUTTING AND PITTING MACHINE
Filed July 1, 1922     4 Sheets-Sheet 4
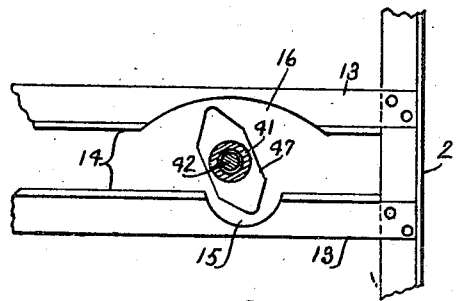
FIGURE 7
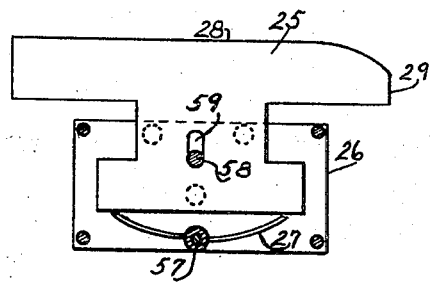
FIGURE 8
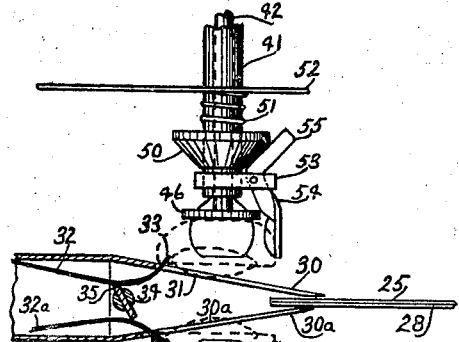
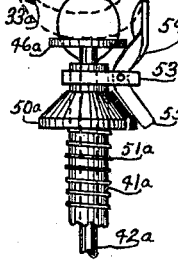
FIGURE 9
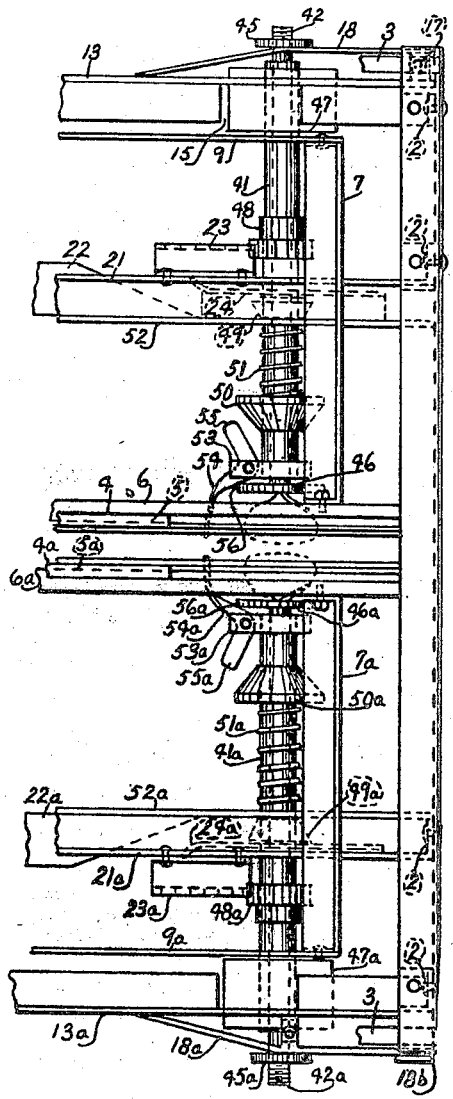
FIGURE 6
INVENTOR
James Turner
BY John A. Grovesmith
ATTORNEY Patented Aug. 14, 1923.

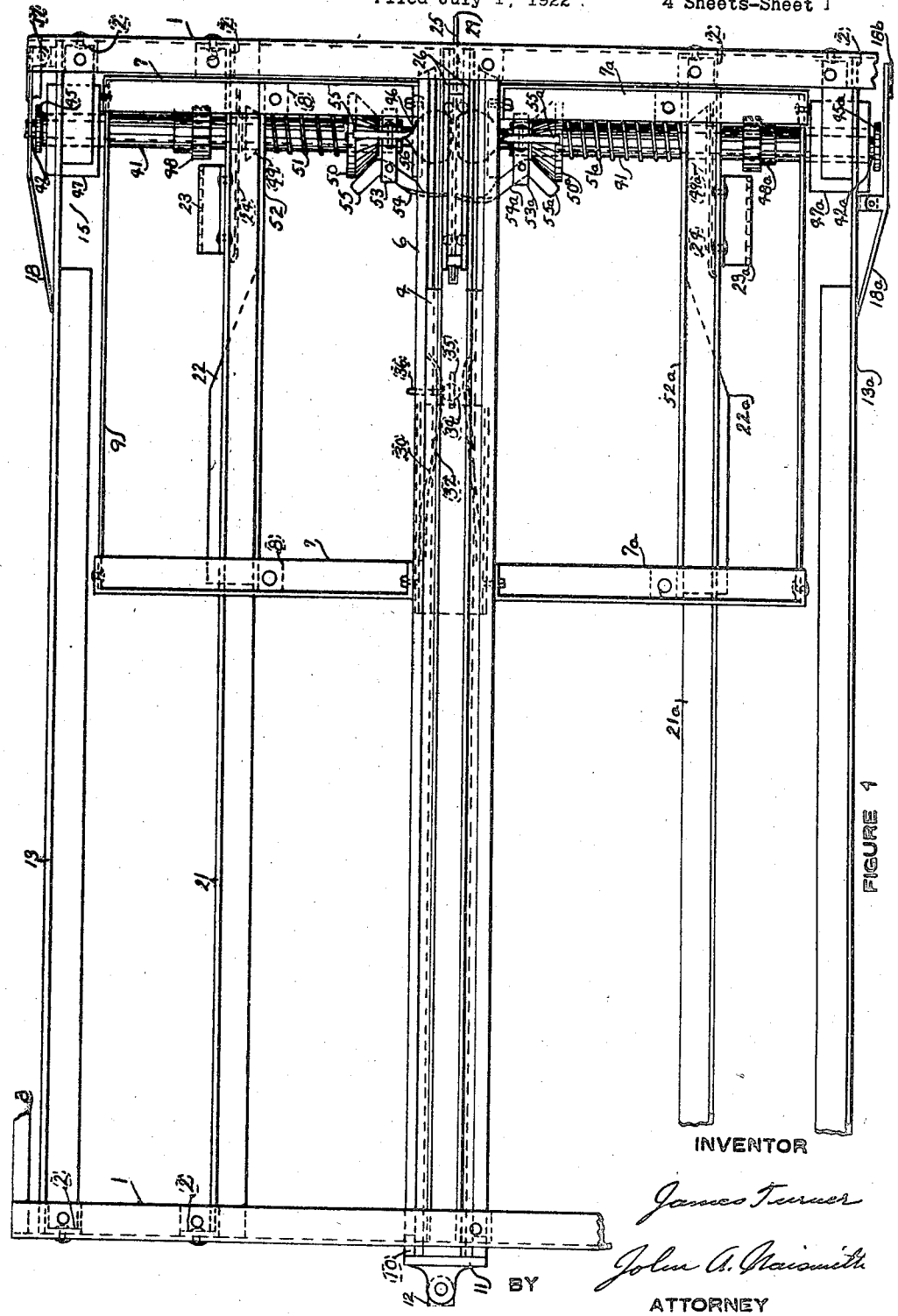

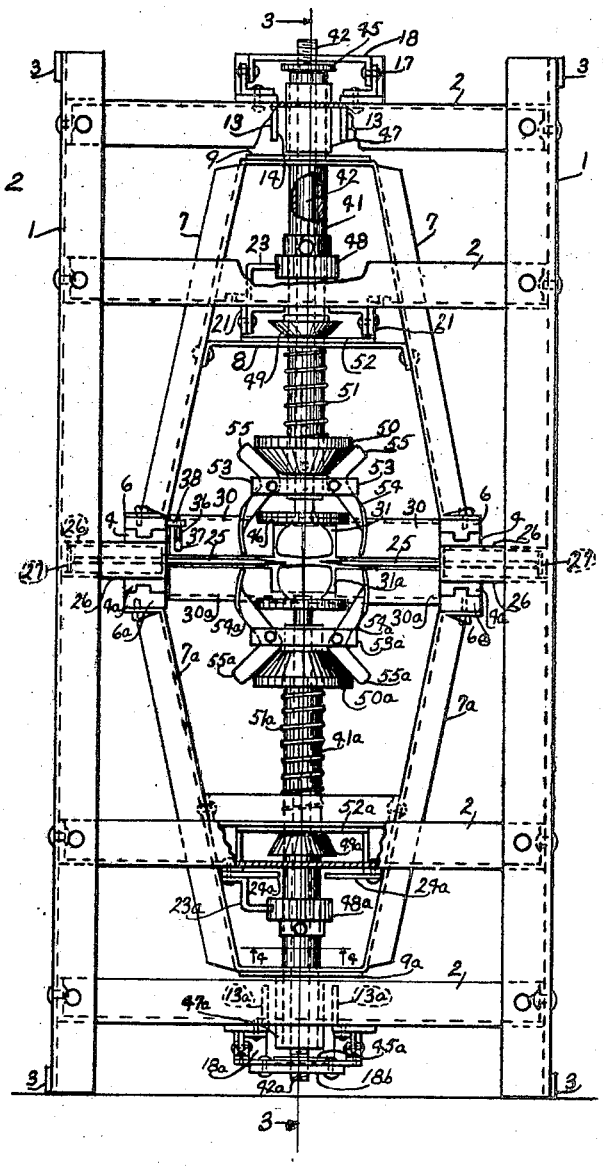

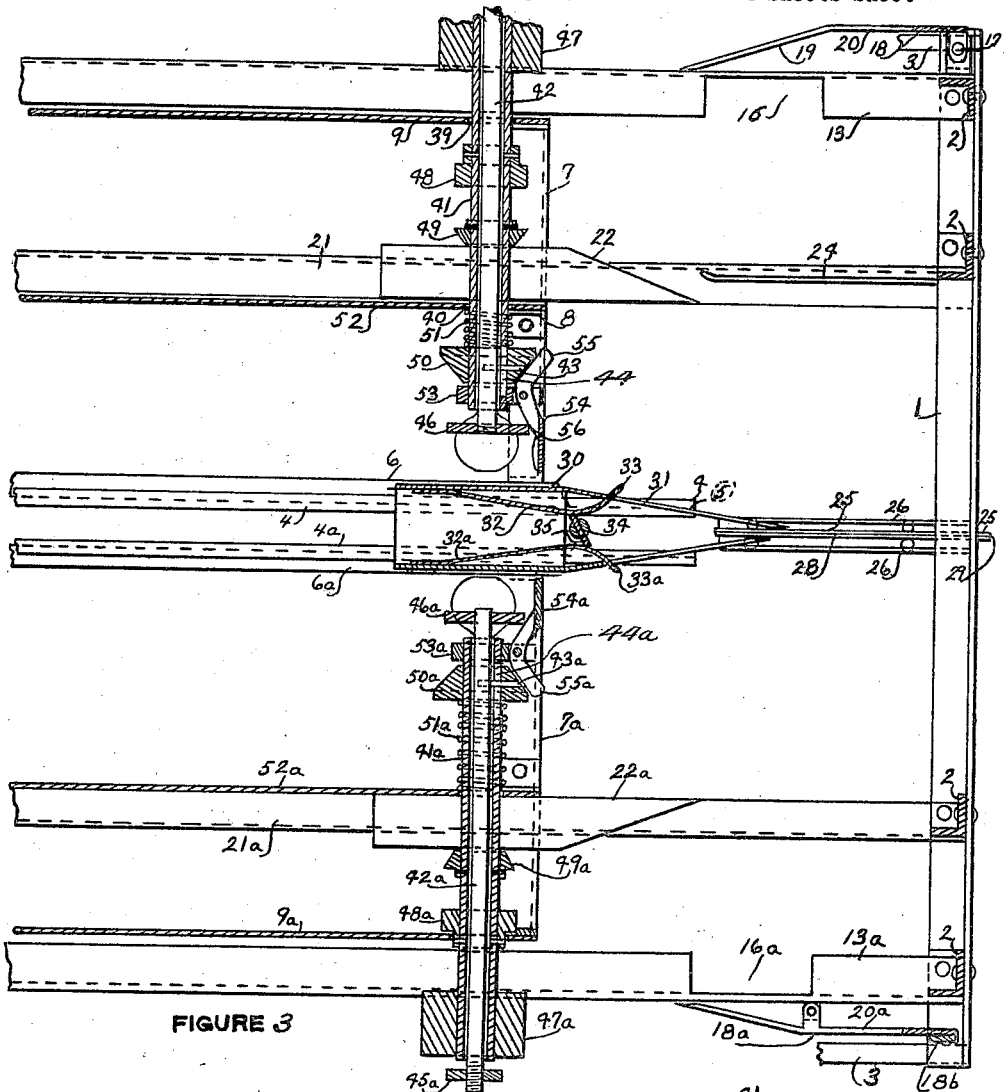
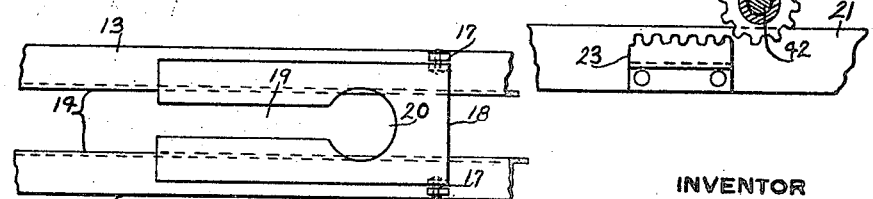

1,464,836

UNITED STATES PATENT OFFICE.

JAMES TURNER, OF CAMPBELL, CALIFORNIA.

FRUIT CUTTING AND PITTING MACHINE.

Application filed July 1, 1922. Serial No. 572,260.

*To all whom it may concern:*

Be it known that I, JAMES TURNER, a citizen of the United States, and resident of Campbell, in the county of Santa Clara and State of California, have invented certain new and useful Improvements in Fruit Cutting and Pitting Machines, of which the following is a specification.

It is the object of my invention to provide a power operated mechanism for cutting and pitting apricots and similar fruit.

In the drawings:—

Figure 1 is a side elevation of my invention, parts being broken away.

Figure 2 is an end view of the same, parts being broken away.

Figure 3 is a transverse cross section on line 3—3 of Figure 2.

Figure 4 is a plan view of the pinion and rack, partly in section taken on line 4—4 of Figure 2.

Figure 5 is a plan view of the upper cam surface.

Figure 6 is a side elevation showing the carriage about to be placed in a position to open the fingers to receive an apricot, parts being broken away.

Figure 7 is a plan view, partly in section, showing one of the revolving shoes turning in its guide members, parts being broken away.

Figure 8 is a plan view, partly in section, showing the knife holding mechanism.

Figure 9 is an elevation, partly in section, showing the spring members about to remove the pit from the fruit shown in dotted lines.

Referring more particularly to the drawings, I show a frame work comprising uprights 1—1—1—1, transversely arranged tie members 2—2—2—2 and longitudinal tie members 3—3—3—3.

The mechanism built up on this frame is in two almost identical parts; an upper part including fruit grasping fingers mounted to reciprocate adjacent to and parallel with the longitudinal axis of the machine, and a lower part functioning in the same manner and in unison with the upper part but in opposed relation thereto. Since the mechanisms of the upper and lower parts are practically identical the construction and operation of the upper part will be set forth in detail and the several parts designated by suitable figures, the corresponding parts of the lower part being indicated by similar figures followed by an appropriate letter.

In the embodiment of the machine herein disclosed I show at 4—4 a pair of parallel spaced guides having grooves 5—5 formed therein. At 6—6 are T shaped bars slidably engaging grooves 5—5 and carrying a secondary frame comprising uprights 7, cross bars 8 and longitudinal bar 9, the two bars 6—6 being connected at their rear ends by a cross bar 10 and to the corresponding sliding bars 6$^a$—6$^a$ in the lower part of the machine by bars 11 so that by attaching a power operated arm as 12 to bar 10 the two sets of slidable bars 6—6 and 6$^a$—6$^a$ and all parts carried by them may be reciprocated as a unitary structure.

Mounted on front and rear top cross tie members 2—2 are two bars 13—13 arranged to form a guide 14 extending longitudinally of the machine, sections as 15—16 being cut out of said bars for the purpose hereinafter set forth. Pivotally mounted at 17 and forwardly of openings 15—16 is a plate 18 having a groove 19 formed therein in alignment with guide 14 and terminating in an annular opening 20, the said plate having its pivotal end raised a distance above guide 14 and extending inwardly of the machine a distance in a horizontal plane and thence sloping down to contact with the bars 13—13 so that groove 19 forms a continuation of guide 14.

At a suitable distance above guides 4—4 and passing longitudinally of the machine within secondary frame 7—8—9 are two parallel bars 21—21 supported at each end on tie members 2—2 of the main frame. These bars support cam tracks 22—22 a distance back from the forward end of the machine and directed forwardly thereof, and a rack 23 positioned as shown between the cam tracks 22—22 and the axis of the annular opening 20 in plate 18. Also mounted on bars 21—21 forwardly of cam tracks 22—22 and adjacent rack 23 are short tracks 24—24 as shown.

Mounted in a horizontal plane passing through the longitudinal axis of the machine are knives 25—25, each knife being arranged between two plates as 26—26 and resiliently mounted by means of a spring 27 secured at a central point and bearing against the knife at both ends whereby the knife will give way angularly at either end or uniformly throughout its length. Knives 25—25 normally lie with their cutting edges 28—28 parallel and curving outwardly and away from each other at their forward ends 29—29.

Mounted on main frame 1 and having its forward end contiguous to the upper surfaces of knives 25—25 is a short upwardly directed cam plate 30 having a notch 31 formed in the cam portion of the plate and in the central part thereof. At 32 is shown a spring member mounted on the under surface of plate 30 normally extending forwardly and downwardly a distance and thence upwardly a distance and terminating in a rounded point 33 just below the notch 31. At 34 is a pin carrying a spreader arm 35 contacting with the under surface of spring member 32 and provided with an arm 36 extending through notch 31 in plate 30. Arm 36 is so arranged that when thrown backwardly a distance the spreader 35 engages spring 32 and forces its point 33 a slight distance through notch 31 whereby to engage the pit in a halved apricot and extract it from the same.

The sliding bar 6 adjacent arm 36 carries a pin 38 in such a position as to engage arm 36 at the proper moment when the halved fruit is being carried over cam plate 30. Arm 36 being short the pin 38 will carry it back and then pass over it, whereupon the spring 32 will return it to its normal position.

Having now described the more stationary parts of the machine I will describe in detail the parts carried by the sliding bars 6—6 and secondary frame 7—8—9 carried thereby.

Revolubly mounted in vertically aligned orifices 39—40 in secondary frame 7—8—9 is a tube 41 having a rod 42 slidably mounted therein and revolving therewith by means of a pin 43 in rod 42 and slot 44 in tube 41, the rod 42 having a button 45 on its upper end and a spreader plate 46 mounted on its lower end.

Tube 41 carries a shoe 47 on its upper end, the said shoe being elongated in shape and sliding in guide 14 between bars 13—13. At 48 is a pinion mounted on tube 41, and at 49 is a shoe operating on the upper surface of cam tracks 22—22 and the lower surface of tracks 24—24.

Pin 43 secures an annular cam plate 50 to rod 41, the rod 41 being normally held in a lowered position by means of a spring 51 inserted between plate 50 and cross bar 52 on frame 7—8—9.

Securely mounted on tube 41 is a supporting disc 53 on which are pivotally mounted depending fingers 54—54—54, each finger having an upwardly and outwardly extending arm 55—55—55 adapted to engage the under surface of plate 50, the inner supporting stem of each plate being adapted to engage button 46 as shown at 56—56—56. These fingers are three in number and so arranged that when in a position to receive fruit as in Figures 1–2 a finger is positioned at each side and one in the rear leaving the front of the grasping device open to permit the insertion of a fruit therein.

It should here be pointed out that the plate 18 is normally held in contact with bars 13—13 by its own weight. Since plate $18^a$ must also be normally held in contact with bars $13^a$—$13^a$ it is provided with a counterbalance as $18^b$ whereby the desired result is secured.

Supposing, now, the machine to be in operation with the secondary frame 7—8—9 retracted to the limit of its movement and an apricot positioned by hand on knives 25—25, the said apricot lying with its pit in a horizontal plane. The frame 7—8—9 now moves forwardly, the shoe 47 holding the parts in their proper positions until after shoe 49 rides down cam tracks 22—22 and under tracks 24—24 whereby the tube 41 and parts carried thereby are prevented from rising.

As the above described action takes place the button 45 engages groove 19 in plate 18 and rides up said plate thereby drawing rod 42 upwardly in tube 41 against spring 51 and causing spreader 46 to engage parts 56—56—56 of fingers 54—54—54 and causing them to open up. At the same time pinion 48 engages rack 23 thereby causing the whole tube 41 and parts carried thereby to make a full half turn with the fingers 54—54—54 in position to grasp the fruit as hereinbefore described. It is now clear that the openings 15—16 in bars 13—13 are necessary to permit the turning of shoe 47. When however, the button 45 reaches annular orifice 20 the spring 51 pulls the parts back into their former relative positions, the downward movement of cam plate 50 closing fingers 54—54—54 upon the fruit.

When the frame 7—8—9 is retracted the tube 41 is again rotated a full half turn thereby causing the knives 25—25 to cut the apricot all around up to the pit, the resilient mounting of the knives permitting them to follow the outline of any form and size of pit.

As the backward movement of the parts continues the shoe 49 again rides up on cam tracks 22—22 thereby gradually raising rod 42 and carrying the split half of the apricot up over cam plate 30, the pin 38 engaging arm 36 and causing points 33 of spring elements 32 to project slightly through notches 31 so as to engage the pit in the apricot and pry the same loose therefrom.

The grasping devices now carry the severed apricot past the ends of cam plate 30 where the two halves fall into a waiting receptacle not shown. The forward movement of frame 7—8—9 again moves forwardly and the operation is repeated.

The knives 25—25 are permitted to move freely to engage a pit of any size or contour by means of pins 55 in plates 26 engaging slots 56 arranged in said knives as shown. Since the leaf springs 27 are fixed at their centers 57 either end of the knives may move backwardly or the whole knife may retract as occasion demands.

It may now be seen that I have provided a device that requires only the placing, by hand of the apricots in position, the mechanism described halving it, pitting it and returning for another at any desired speed, the whole operation being entirely automatic.

It is to be understood, of course, that while I have herein shown and described one particular embodiment of my invention, changes may be made in form, proportion, construction, and method of operation within the scope of the appended claims. It is not only desired to cover broadly the mechanism as a whole but also to cover the several separate mechanisms in which novelty resides.

I claim:—

1. A fruit cutting and pitting machine comprising a pair of opposed expansible fruit grasping devices, means for advancing and retracting said devices at predetermined intervals, means for expanding and contracting each of said devices at predetermined intervals, a pair of opposed knives having their cutting edges passing between said fruit grasping devices, and means for imparting a rotary motion to said devices.

2. A fruit cutting and pitting machine comprising a pair of opposed expansible fruit grasping devices, means for advancing and retracting said devices at predetermined intervals, means for expanding and contracting each of said devices at predetermined intervals, a pair of opposed knives having their cutting edges passing between said fruit grasping devices, and means for imparting a rotary motion to said devices, immediately after contraction thereof.

3. A fruit cutting and pitting machine comprising a pair of opposed expansible fruit grasping devices, means for advancing and retracting said devices at predetermined intervals, means for expanding and contracting each of said devices at predetermined intervals, a pair of resiliently mounted opposed knives lying in a plane at right angles to the axis of said grasping devices and having their cutting edges passing between said devices, and means for rotating said devices a predetermined distance.

4. In a fruit cutting and pitting machine, a supporting framework, a pair of knives pivotally mounted thereon and lying in the same horizontal plane and having their cutting edges in opposed relation to each other, and a resilient support for each end of each knife whereby to normally maintain said cutting edges in parallel relation to each other.

5. In a fruit cutting and pitting machine, a pair of knives lying in the same plane and having their cutting edges in opposed relation to each other, and having slots formed therein at right angles to said edges and in substantially the center of said knives, a stationary pin engaging each slot, and a leaf spring secured in its center to a fixed support back of each knife and having its ends engaging the ends of the adjacent knife.

6. A fruit cutting and pitting machine comprising a frame, a pair of knives supported thereby and lying in the same plane with their cutting edges opposed in relation to each other, a carriage mounted to reciprocate on said frame, a pair of opposed expansible fruit grasping devices mounted on said carriage and moving on opposite sides of said knives and in close relation thereto, and means for rotating said grasping devices a half turn while moving in either direction along said knives.

7. A pair of opposed knives resiliently mounted in a given plane, a pair of opposed expansible fruit grasping devices mounted to reciprocate in a plane vertical to the plane of said knives and passing midway therebetween, one on each side of said knives, and normally positioned near one end thereof, means for expanding said grasping devices when approaching said normal position and means for contracting said devices at the moment of returning to said normal position.

8. A pair of opposed knives resiliently mounted in a given plane, a pair of opposed expansible fruit grasping devices mounted to reciprocate in a plane vertical to the plane of said knives and passing midway therebetween, one on each side of said knives, and normally positioned near one end thereof, means for expanding said grasping devices when approaching said normal position and means for contracting said devices at the moment of returning to said normal position, and a pit removing device operatively mounted in the path of travel of said devices.

9. A pair of opposed knives resiliently mounted in a given plane, a pair of opposed expansible fruit grasping devices mounted to reciprocate in a plane vertical to the plane of said knives and passing midway therebetween, one on each side of said knives, and normally positioned near one end thereof, means for expanding said grasping devices when approaching said normal position and means for contracting said devices at the moment of returning to said normal position, a pair of opposed spring elements mounted in fixed relation to said knives and adjacent the path of travel of said devices, and means for projecting said spring element a distance into the path of travel of said devices at a given point in their movement away from said normal position.

10. A pair of opposed knives resiliently mounted in a given plane, an expansible fruit grasping device mounted to reciprocate adjacent said knives in a plane vertical to the plane of said knives and passing midway therebetween, means for expanding said device as it approaches the end of its path of travel adjacent said knives, and means for contracting said device at the end of its path of travel adjacent said knives.

11. A pair of opposed knives resiliently mounted in a given plane an expansible fruit grasping device mounted to reciprocate adjacent said knives in a plane vertical to the plane of said knives and passing midway therebetween, means for retracting said device from the plane of said knives as it approaches one end of its path of travel, and returning the same to its former position as it returns to the forward end of its path of travel, means for expanding said device as it approaches the forward end of its path of travel, means for contracting said device as it reaches said forward end of its path of travel, and a pit removing device arrranged in the path of travel of said device at the point where the same is retracted from the plane of said knives.

12. A fruit grasping device comprising a rod and means for advancing and retracting the same, a spreader element mounted on one end thereof, a finger actuating device mounted thereon a distance from said spreader, a support intermediate said spreader and actuating device, and a plurality of fingers pivotally mounted on said support whereby to be expanded by said spreader when said rod is moved in one direction and contracted by said actuating device when said rod is moved in the opposite direction.

13. A fruit grasping device comprising a rod and means for advancing and retracting the same, a spreader element mounted on one end thereof, a finger actuating device mounted thereon a distance from said spreader, a support intermediate said spreader and actuating device, and a plurality of fingers pivotally mounted on said support, each finger carrying an outwardly extending arm engageable with said actuating device when the same is advanced to close said fingers.

14. A fruit grasping device comprising a supporting frame, a tubular element mounted thereon, resilient means for advancing said tube, means arranged on said tube and engaging said frame for limiting the advance movement of said tube, a rod mounted for axial movement in said tube, means for limiting said axial movement, fruit grasping fingers pivotally mounted on said tube, means operated by the movement of said tube in one direction for contracting said fingers, and means operated by the movement of said rod in the opposite direction for expanding said fingers.

15. A fruit grasping device comprising a supporting frame, a tubular element mounted thereon, resilient means for advancing said tube, means arranged on said tube and engaging said frame for limiting the advance movement of said tube, a rod mounted for axial movement in said tube, means for limiting said axial movement, fruit grasping fingers pivotally mounted on said tube, means operated by the movement of said tube in one direction for contracting said fingers, means operated by the movement of said rod in the opposite direction for expanding said fingers, and means for alternately actuating said tube and rod in opposite directions.

16. A fruit cutting and pitting machine comprising a pair of opposed expansible fruit grasping devices, means for advancing and retracting said devices at predetermined intervals, means rendered operable by said advancing and retracting means for expanding and contracting each of said devices, a pair of opposed knives having their cutting edges passing between said fruit grasping devices, and means for imparting a rotary motion to said devices.

JAMES TURNER.